June 6, 1961  P. P. USHKARITYS  2,987,284
METAL CUSHION FOR HOSE OR PIPE CLAMPS
Filed Jan. 14, 1959
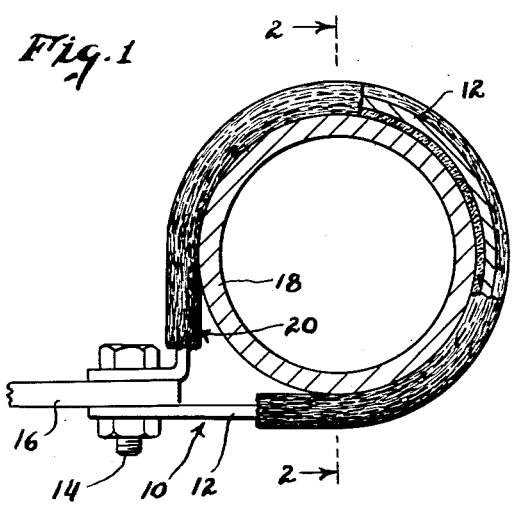
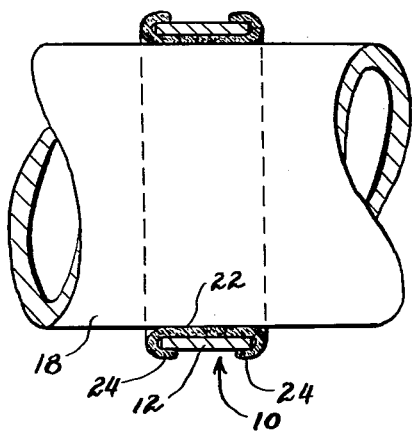
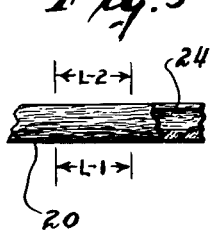
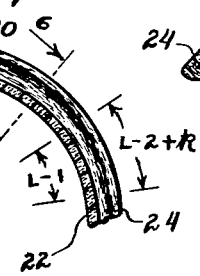
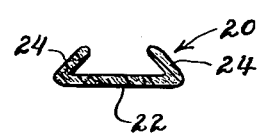
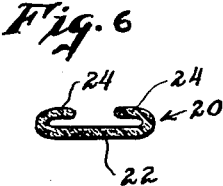
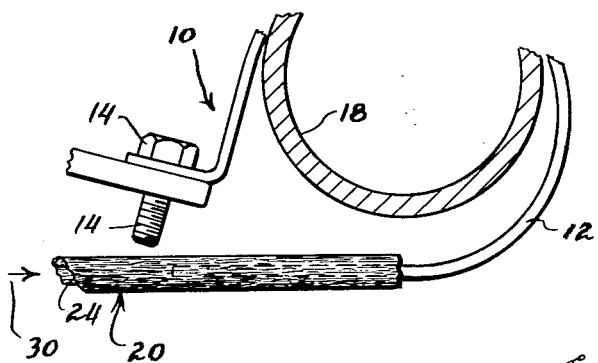
INVENTOR.
Peter Paul Ushkaritys
BY
Emery, Whittemore, Sandoe & Dix
ATTORNEYS United States Patent Office 2,987,284
Patented June 6, 1961

2,987,284
METAL CUSHION FOR HOSE OR PIPE CLAMPS
Peter Paul Ushkaritys, Union, N.J., assignor to Metal Textile Corporation, Roselle, N.J., a corporation of Delaware
Filed Jan. 14, 1959, Ser. No. 786,744
3 Claims. (Cl. 248—74)

This invention relates to cushions for pipe, hose and conduit clamps and more especially to metallic cushions for withstanding high temperatures.

When such clamps were first used under conditions subject to vibration, it was found necessary to line the inside of the clamp with some sort of resilient material to keep the clamps from wearing through copper tubing, hose or electrical cable. Rubber and plastic cushions were first used but when it became necessary to withstand high temperatures, metal cushions were devised for the purpose.

The most satisfactory cushions for high-temperature use have been made with a mass of suitable size wires, knitted into a mesh which forms a pad of the proper thickness and density to withstand the conditions to be encountered. Holding such metal cushions in place has presented a problem. It has been the common practice to spot weld the cushion to the inside of the clamp at several points. This is inconvenient in that it entails considerable time, but more especially because of the fact that the metal cushions are often used on airplanes and other mobile equipment which which may be a long way from a servicing location at which welding equipment is available.

It is an object of this invention to provide an improved cushion for clamps of the character indicated, and to provide a cushion which can be applied by unskilled workmen and without any necessity for welding or other fastening means.

Another object of the invention is to provide a clamp cushion which has flanged edges which are pulled downwardly and inwardly to hold the cushion against displacement when the cushion is bent to the curvature of the clamp.

One of the advantages of the invention is that under many operating conditions, cushions made in accordance with this invention can be removed and replaced with new ones while the clamp is in place; it being merely necessary to release the pressure on the clamp.

Other objects, features and advantages of the invention will appear or be pointed out as the description proceeds.

In the drawing, forming a part hereof, in which like reference characters indicate corresponding parts in all the views:

FIGURE 1 is an end view, partly broken away and in section, showing a clamp made in accordance with this invention and located in working relation on a pipe;

FIGURE 2 is a sectional view taken on the line 2—2 of FIGURE 1;

FIGURE 3 is a fragmentary view, partly in section, showing a length of the clamp cushion before it is applied to the clamp;

FIGURE 4 is a diagrammatic, sectional view showing the way in which the bending of the cushion causes the side flanges to pull downward;

FIGURES 5 and 6 are sectional views taken on the lines 5—5 and 6—6, respectively, of FIGURE 4;

FIGURE 7 is a sectional view showing the way in which the cushion of FIGURE 6 grips the clamp; and FIGURE 8 is a fragmentary view showing the way in which a new cushion can be applied to a clamp without removing the clamp from a pipe.

FIGURE 1 shows a pipe clamp 10 consisting of a metal strap 12 secured by a bolt 14 to a clamp support 16. The clamp 10 holds a pipe 18; and although the preferred embodiment of the invention will be described as a pipe clamp, it will be understood that the pipe is merely representative of cylindrical elements, such as hose and electric conduit, which it is necessary to clamp in place at various locations along their length.

A metallic cushion 20 is located between the strap 12 and the pipe 18. This cushion is made of wire knitted to provide a mesh of the desired thickness and resilience for the kind of use for which it is intended. The kind of wire used is not a novel element of this invention and various conventional knitted meshes can be used.

This cushion is made of knitted metal wire consisting of a multiplicity of interlinked loops which are not locked, thereby enabling a certain degree of movement in the loop structure under certain conditions; that is, the mesh has the property of the loops being pushed together or stretched out to a point where all the slack in the loops is taken up. This is rather essential when a cushion is made of a certain thickness in strip form and has to be bent around a circle of a given diameter. In order not to change the shape of the volume of the cushion, the loops in the outside layers have the slack taken up when bent around a circle, likewise, the loops on the inside layers, more or less, push together. Owing to these two factors, it is possible to make such conditions which will maintain their desired volumetric shape.

Furthermore, more resiliency can be obtained in making a cushion of knitted mesh than can be had with woven mesh owing to the freedom of movement in the loops of the knitted mesh which have the ability to adjust themselves within the full thickness of the clamp pad.

The cushion 20 is constructed in straight lengths having a channel cross section, as shown in FIGURE 5. The cushion has a bottom portion 22 and two side flanges 24. In making the cushion, the mesh is compressed to the desired cushion thickness and calendered so as to form the side flanges 24. It is an essential feature of the invention that the side flanges 24 make an acute angle with the bottom portion 22. Because of this angular relation of the side flanges 24 with the bottom portion 22, the side flanges are pulled inwardly and downwardly to form the undercut channel cross section, shown in FIGURE 6, when the cushion is bent to the curvature of a pipe clamp.

FIGURES 3 and 4 illustrate the principle of the invention. As originally manufactured in a continuous length, the cushion 20 is in the condition shown in FIGURE 3. A unit length of the bottom of the cushion, represented by the dimension line L–1, is of the same length as a corresponding unit L–2 along the top of one of the side flanges 24. When a length of the cushion 20 is bent to an arcuate shape, as shown in FIGURE 4, the unit length L–1 is nearer to the center of curvature than is the outer length L–2. This tends to stretch the unit length L–2 to the dimension indicated by the reference character L–2+$k$. While the force required to stretch the outer portion of the cushion will sometimes result in some compression of the inner length units, there is always tension set up in the upper part of each of the side flanges 24 when the cushion is bent about a curve, as shown in FIGURE 4.

If the side flanges 24 were at right angles to the bottom portion 22, and were held in such right-angle relation, the tension would rupture the upper edges of the side flanges; but with the side flanges sloping inwardly, as shown in FIGURE 5, this tension causes the upper edges of the side flanges to pull downward, as shown in FIGURE 6, since this brings them closer to the center of curvature and reduces the tension.

When there is a pipe clamp strap 12 located over the bottom portion 22 of the cushion 20 during the bending of the cushion, then the side flanges 24 are pulled downwardly against the side of the strap opposite the bottom portion of the cushion, as shown in FIGURE 7. This firmly secures the cushion to the strap 12 even before the cushion is clamped against a pipe.

In addition to the advantage of holding the cushion firmly in place on the clamp, the side flanges 24 serve an additional purpose. Frequently, clamps are put on where the inside of the clamp is not parallel with the pipe, hose or cable, and when the clamp is tightened down, the sharp corners of the clamp strap have a tendency to cut into the pipe, or other element, whereas the cushion of this invention prevents any such cutting because of the extension of the side flanges 24 around the corners of the strap.

FIGURE 8 shows the way in which the cushion 20 can be applied to the clamp strap 12 without removing the clamp from the pipe 18. In this view the strap has been released by the bolt 14 so as to leave some clearance between the pipe and strap, and the cushion 20 is pushed longitudinally along the length of the strap 12 in the direction indicated by the arrow 30. As the cushion 20 advances further along the length of the pipe strap 12, the cushion bends to the shape of the strap and then bends further as the strap is eventually tightened to bring it closer to the pipe 18. When supplied in continuous lengths, the cushion 20 can be cut where necessary to provide the proper length for any particular pipe clamp.

The construction of this invention is suitable for making cushions of inconel wire, or stainless steel wire of any type, or wires of various metals and alloys for withstanding extremely high temperatures.

The preferred embodiment of the invention has been illustrated and described, but changes and modifications can be made and some features of the invention can be used in different combinations without departing from the invention as defined in the claims.

What is claimed is:

1. A metal cushion for yieldably holding a pipe in a clamping strap that is curved to fit around the pipe, the cushion being constructed of a plurality of layers of knitted metal wire of plain knit with the strands of wire flexible and the wire having a multiplicity of loosely interlinked loops, the cushion being formed with a bottom portion made of superimposed layers of the knitted metal wire and that lines the inside of the strap, and a side portion that extends upwardly from along the side of the bottom portion and inwardly across the top of the bottom portion at an acute angle to said bottom portion when the bottom portion is in a straight and flat undistorted condition; the loops of wire having undulations transverse of the length of the cushion whereby loops of the outside layers have slack which is taken up and the loops of the inside layers can push together when the cushion is bent to the curvature of the strap, the loops in the strands having an amplitude that supplies slack of greater length than the change in length of the side portion when the cushion is bent into a circumference, and the strands of said side portion having a restraining force imparted to them by the resistance to flexing as the loops of wire unbend when the slack is taken up in said outer layers as the cushion is bent lengthwise to a circumferential curvature of the strap whereby the layers of the knitted wire of said side portion wrap themselves around the edges of the strap and hug the outside thereof along the curve of the strap without stretching of any of the individual wires.

2. The metal cushion described in claim 1 and in which there are similar side portions along opposite sides of the bottom portion.

3. The metal cushion described in claim 2, and in which each of the side portions is of a height to extend substantially less than one-half way across the width of the bottom portion when pulled down into a position adjacent to the top surface of the bottom portion of the cushion.

References Cited in the file of this patent

UNITED STATES PATENTS 2,790,614     Miller _____ Apr. 30, 1957

FOREIGN PATENTS 597,259     Great Britain _____ Jan. 21, 1948